Dec. 3, 1929.  T. THEOHARIS ET AL  1,737,900
STREET INDICATING AND ADVERTISING DEVICE
Filed Oct. 4, 1928   5 Sheets-Sheet 2
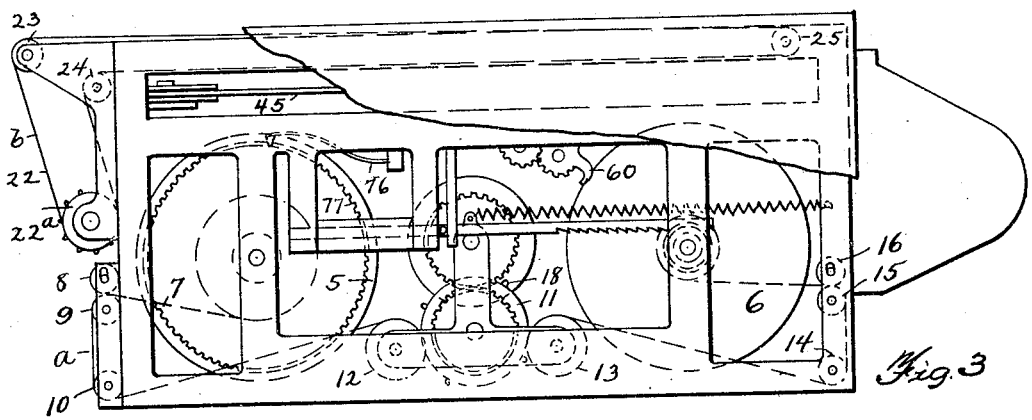
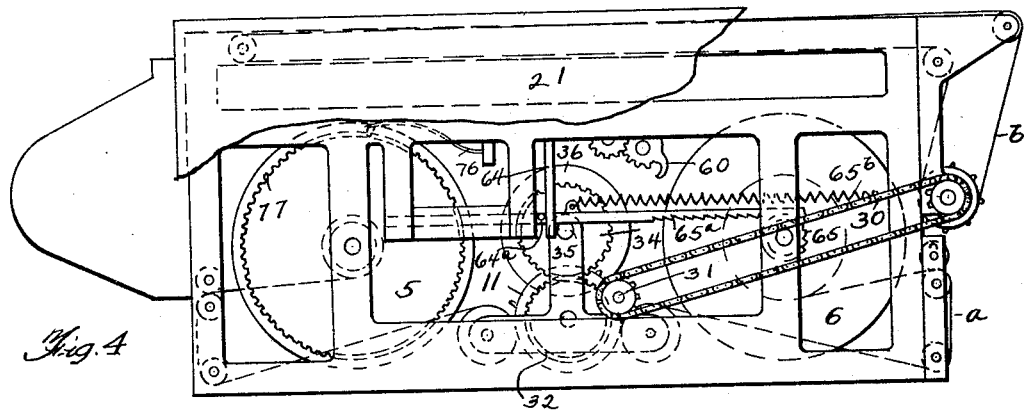
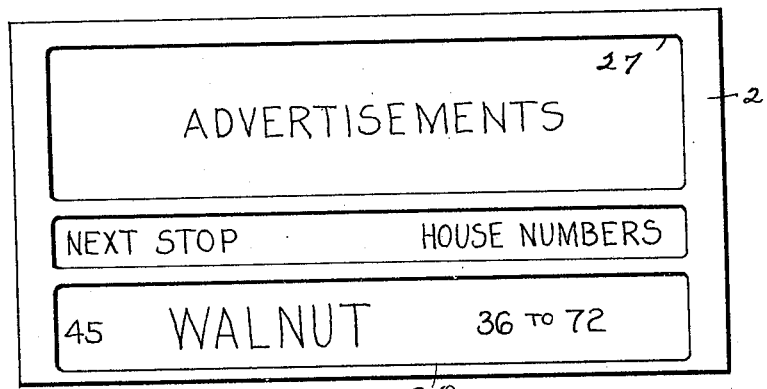
Inventors
THEMISTOCLES THEOHARIS
JOHN FOTAKIS,
By Samuel Herrick,
Attorney Inventors
THEMISTOCLES THEOHARIS
JOHN FOTAKIS,
By Samuel Herrick
Attorney Dec. 3, 1929.   T. THEOHARIS ET AL   1,737,900
STREET INDICATING AND ADVERTISING DEVICE
Filed Oct. 4, 1928   5 Sheets-Sheet 4

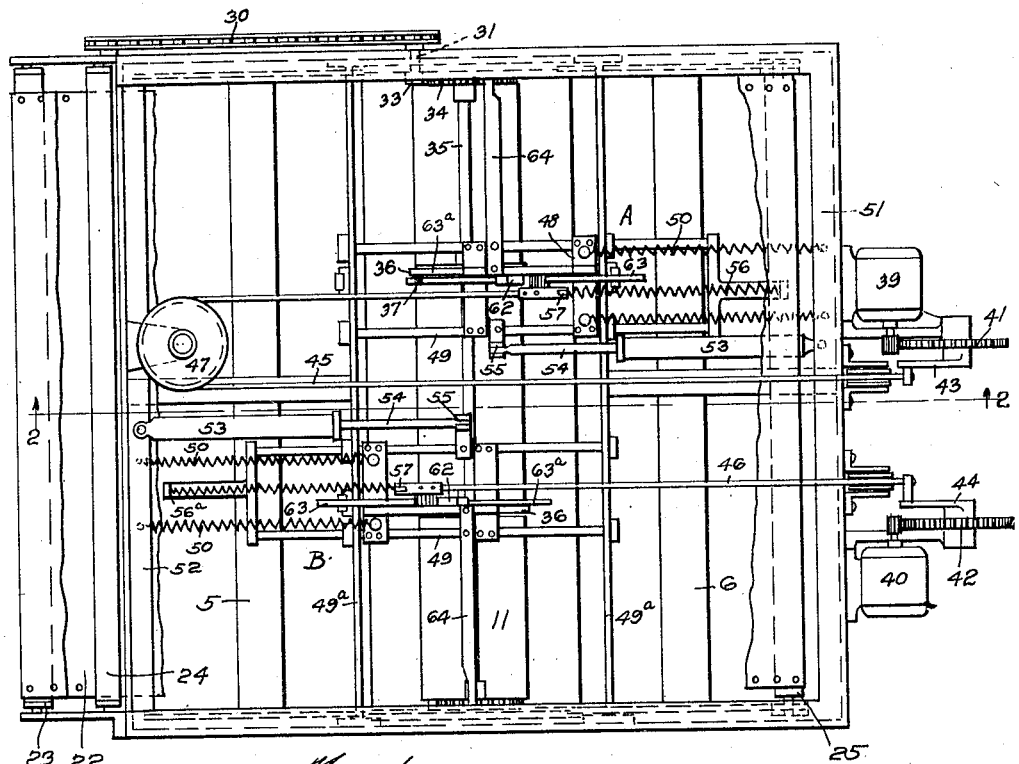

Inventors
THEMISTOCLES THEOHARIS
JOHN FOTAKIS,
By Samuel Herrick,
Attorney

Dec. 3, 1929.  T. THEOHARIS ET AL  1,737,900
STREET INDICATING AND ADVERTISING DEVICE
Filed Oct. 4, 1928   5 Sheets-Sheet 5
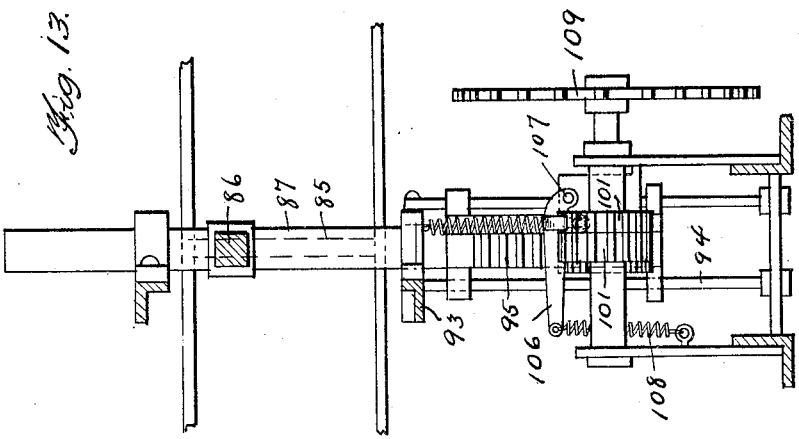
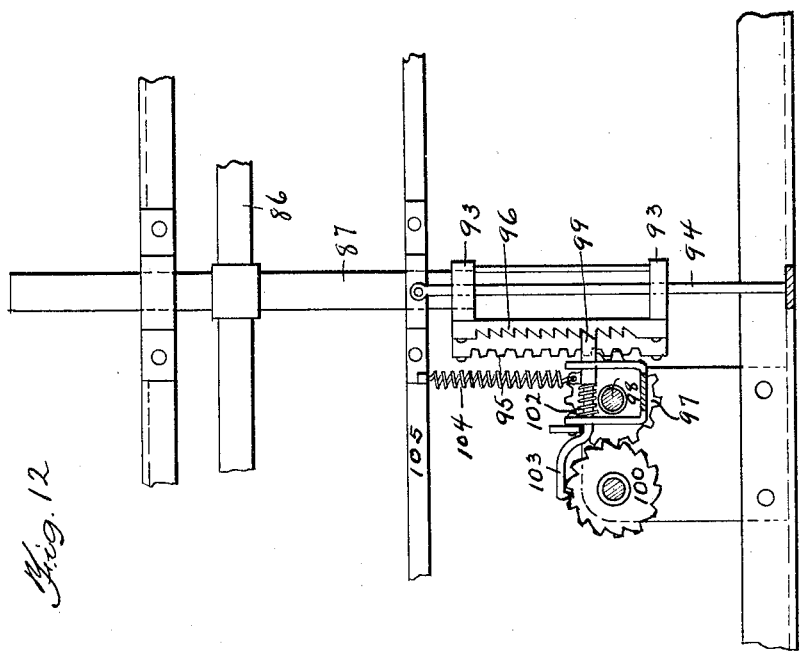
Inventors
THEMISTOCLES THEOHARIS
JOHN FOTAKIS,
By Samuel Herrick,
Attorney Patented Dec. 3, 1929

1,737,900

UNITED STATES PATENT OFFICE

THEMISTOCLES THEOHARIS AND JOHN FOTAKIS, OF TAMPA, FLORIDA, ASSIGNORS OF TWENTY PER CENT TO IRENE N. NICKOLAS, OF TARPON SPRINGS, FLORIDA

STREET-INDICATING AND ADVERTISING DEVICE

Application filed October 4, 1928. Serial No. 310,415.

This invention relates to a combined street indicating and advertising device for use upon railroad trains, street cars, busses, and the like, and it has for its object to provide improved mechanism of this character, so arranged that it will operate, with certainty, under all conditions of weather, and under the many varying conditions to be met with, in the practical operation of public conveyances, of the character named.

It is a primary object of the invention to provide an article of the character indicated which, instead of constituting an item of expense to the transportation companies, will constitute a revenue producing means, through its function of displaying advertising signs in conjunction with the display of the street names.

Further objects and advantages of the invention will be set forth in the detailed description which follows.

In the accompanying drawing,

Fig. 1 is a plan view of the device.

Fig. 2 is a longitudinal vertical sectional view upon line 2—2 of Fig. 1.

Fig. 3 is a side elevation looking from one side of the mechanism.

Fig. 4 is a side elevation looking over the opposite side of the mechanism.

Fig. 5 is a front elevation of a portion of the housing.

Figs. 12 and 13 are vertical sectional views at right angles to each other, of the structures of Figs. 10 and 11.

Like numerals designate corresponding parts in all of the figures of the drawing.

Figure 6:
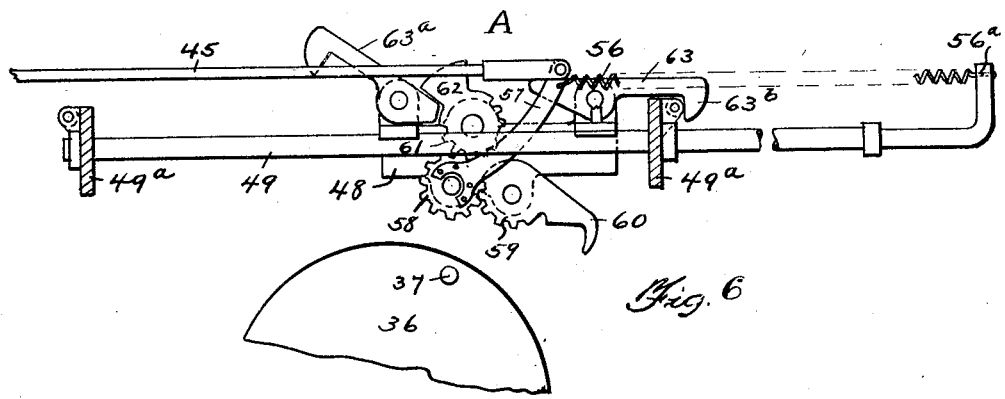
Fig. 6 is a fragmentary sectional view illustrating the operating mechanism, hereinafter described.
Figure 7:
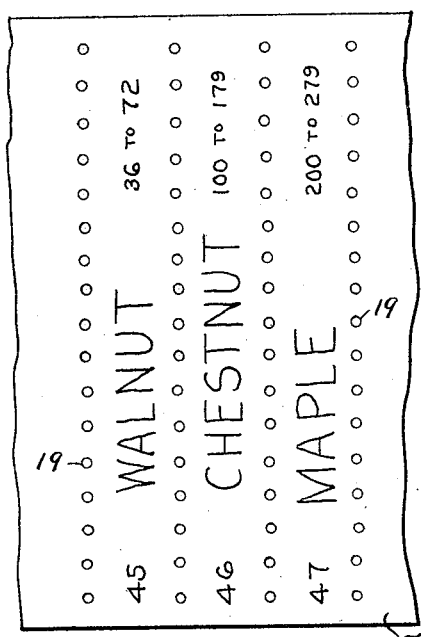
Fig. 7 is a fragmentary view of the street name carrying member.
Figure 8:
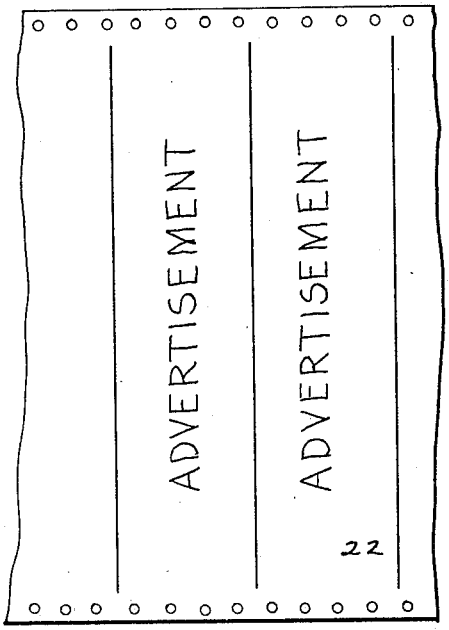
Fig. 8 is a fragmentary view of the advertisment carrying web.

The device of the present invention comprises a pair of spools 5 and 6. A web 7 leads from the spool 5, between guide rolls 8 and 9, extends downwardly and inwardly over guide roll 10, passes beneath a toothed feed roll 11, being held in suitable feeding engagement therewith by pressure rolls 12 and 13, preferably rubber, passes upwardly over guide roll 14 and between guide rolls 15 and 16, to the spool 6. The guide rolls 12 and 13 are annularly grooved, as indicated at 17, to permit the passage of the feed pins 18, while, at the same time, permitting said rolls to lie close to the body of the feed roll 11, and to press the web 7 into engagement with said roll.

The pins 18 engage in feed openings 19, of the web, and it is apparent that movement of the feed roll, in one direction or the other, will feed the web from the spool 5 to the spool 6, or vice versa. The web 7 carries, upon its face, the names of the various streets that are to be crossed by a street car, or like public conveyance, in its travel, and that portion of the web which extends vertically at $a$ is, in use, exposed to the view of persons riding in the street car, through a sight opening 20, of a suitable housing or casing 21, within which the mechanism is placed. A fixed portion of the casing bears the words "Next stop" and "House numbers", and the web bears, opposite each street name, the numbers of the houses located between that street and the next street to be passed. In addition, the web bears a series of numbers, one for each street designation. For example, Walnut Street may be associated with the number 45. This is for the convenience of persons who cannot read English, or for the convenience of persons who cannot read at all. Such persons may be told to get off the car at stop 45, and thus they will be able to determine when they have reached their destination; whether they can read the name of the street, or not. A toothed feeding roll 22ª serves the same feeding function, with respect to an advertisement carrying web 22, that the feed roll 11 serves with respect to the web 7. The web 22 is suitably guided over rolls 23, 24 and 25, the latter being adjustable in slots 26, of the frame, in a well known way, to accommodate webs of varying lengths. That portion of the web 22, indicated at $b$, is exposed to the view of the persons in the car, through a sight opening 27, of the casing. It is not intended to have as many separate advertisements as there are street names, but, upon the contrary, it is preferred to have the names of, say 10, separate advertisers upon the web 22, so that at each tenth exposure of the web, at the opening 27, the same advertisement will be brought into view.

Further, we contemplate putting as many small projections upon the web 22 as there are advertisements upon the web, these projections serving in the moving of the web to engage and operate the mechanism of a bell 28, the purpose of this bell being to attract the attention of the car riders to the new advertisement that has moved into sight. The feed roll $22^a$ is operated by a sprocket mechanism 30, from a shaft 31, and this shaft, in turn, is given a step-by-step movement through spur gear 32, on the shaft of roll 11, and pinion 33, on the shaft 31. The gear 32 also meshes with a gear wheel 34, of a transverse shaft 35, said shaft carrying discs 36, which have pins 37 projecting from their inner sides. It is apparent that, if a step-by-step movement be imparted to this disc, it will, in turn, impart a step-by-step movement to the roll 11, through the gears 34 and 32, which are of the same size. The roll 11 moves one-fourth of a revolution at each of its feeding movements. When the car is travelling in one direction, the web is fed from the roll 5 to the roll 6, and when the car is moving in the opposite direction, along its line of travel, the web 7 is fed from the roll 6, to the roll 5. To bring about this feeding movement, at the proper time, we provide two separate feed mechanisms A—B, and since these are identical, a description of one will serve as a description of the other.

In the particular embodiment of the invention illustrated in Figs 1 and 2, the feed mechanisms are actuated under the control of electric motors 39—40, which drive through reducing gearing 41 and 42, to cranks 43 and 44. The ends of wires, cables, or like suitable flexible members 45, 46 are attached to the said cranks, and it is apparent that if, through the motors, a single revolution be imparted to the cranks, the cables will be drawn upon. The cable 45 is associated with the mechanism A, and passes over an idler pulley 47, while the cable 46 is associated with the mechanism B, and is directly connected thereto. Each mechanism comprises a cross head 48, which comprises guide rods 49, that are slidably mounted in transverse frame members $49^a$. Springs 50, attached to the cross head, and to the end frame members 51—52 tend to draw the cross heads to a retracted position. Pneumatic cushioning elements, comprising cylinders 53, and pistons 54, are connected to the frame and to the cross head, respectively, as indicated at 55, and cushion the movement of the cross heads to their retracted position, under the influence of the springs 50. A spring 56 is connected at one end, to the cross head at $56^a$, and at its other end, to a swinging lever 57. The cables 45—46 are connected to the outer ends of the respective swinging levers 57, of the two mechanisms A and B. The lever 57 is carried by a gear wheel 58 (see Fig. 6), which meshes with a segmental gear 59, having a hook-like projection 60. Thus, when the cable 45, (see Fig. 6) is drawn upon, the movement of lever 57 will tend to turn gear 58 to the left, and segment 59 to the right, and this will result in throwing the hook 60 downwardly to a position where, if it be moved bodily toward the left, it will engage one of the pins 37, of disc 36. The gear 58 also meshes with the teeth 61, of a trip 62, and the same movement of lever 57 that throws the hook downwardly, swings the trip 62 over to the right, to cause it to engage and depress one end of a pivoted detent 63, and lift the nose $63^b$ of said detent out of engagement with the fixed transverse bar $49^a$, which, up to that time, has prevented bodily movement of the mechanism A, for example, toward the left, in Fig. 2. In other words, this detent holds the cross head against sliding movement toward the left until the hook 60 has been moved down into position to engage the proper pin 37, of disc 36, after which the lifting of the detent permits the bodily movement of the cross head and the feed mechanism toward the left, under the continued pull of the cable 45. During this movement, extension 60 strikes the pin 37 and moves the disc one step, and brings the next pin around in position to repeat the operation, when the feed mechanism is again moved to the left. After the crank arm has completed its pulling movement, and passes over the center, and begins to slacken upon the cable, the springs 50 act to return the cross head, and the spring 56 acts to restore the hook 60 to its elevated position. During the movement of the hook to elevated position, the cross head is held against return movement by a second detent $63^a$, which, until said detent is released by trip 62, in its reverse movement, engages one of the transverse frame members $49^a$, and resists movement of the cross head. The return movement of the cross head is retarded and cushioned by the pneumatic checking means 53—54 which reduces shock and noise to a minimum.

It is clear that means must be provided for turning the rolls 5 and 6, to cause them to take up the slack of the web that is fed to them by the feed roll 11, and that this turning movement of the rolls must be a variable one, because sometimes the web is being wound upon a face of small circumference and that, at other times, it is being wound upon a face of considerable circumference. Therefore, we provide a take-up that is under spring action. Since the take-up is duplicated for each of the rolls, a description of one is sufficient for a description of both. Each roll is provided with a ratchet wheel 65, which is engaged by the teeth of a ratchet bar 65$^a$. Springs 65$^b$ tend to draw upon these ratchet bars, in such direction as to cause them to impart turning movement to their respective spools, and these ratchet bars are, in turn, moved in a direction to put the springs under tension by downwardly extending projections 64, of the cross heads, which engage pins 64$^a$, which project laterally from the face of the ratchet bars. In other words, when the springs 50 retract the cross heads, the extensions of the cross heads draw the ratchet bars inwardly and against the tension of their respective spring 65$^b$, and when the cross heads slide upon their feeding movement, their extensions 64 move away from the pins 64$^a$, and permit the spring 65$^b$ to move the ratchet bars, and, consequently, to turn the rolls 5 or 6, as the case may be.

Figure 9:
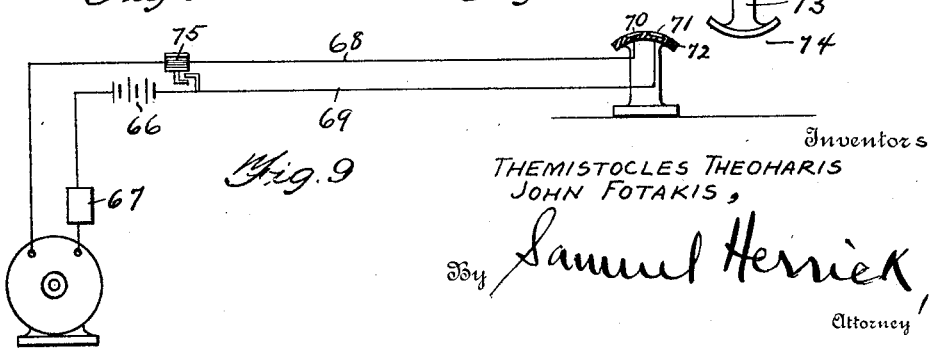
Fig. 9 is a diagrammatic view of electrical connections which may be employed, if desired.
Figure 10:
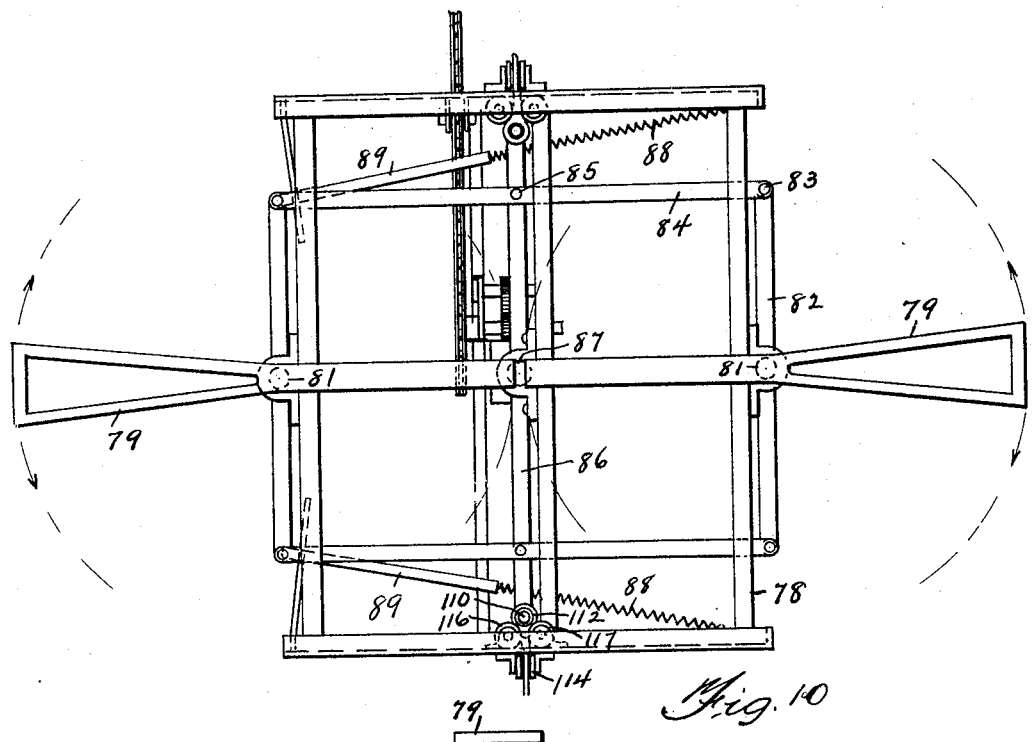
Fig. 10 is a plan view of an actuating mechanism adapted to be mounted on the top of a car.
Figure 11:
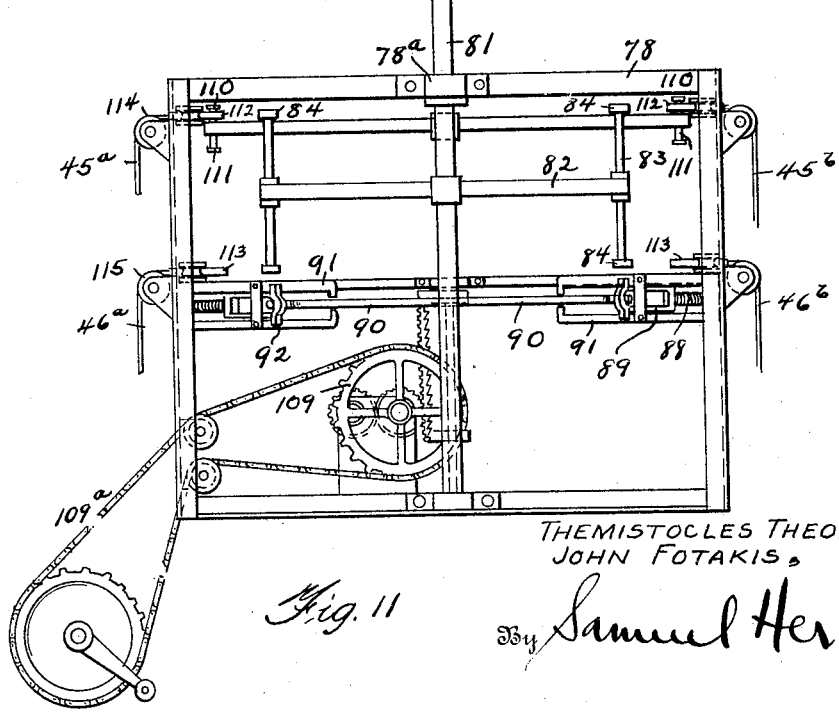
Fig. 11 is a side view of the mechanism of Fig. 10.

In Fig. 9 we have illustrated, diagrammatically, the connections for one of the motors. The source of power may be the current from the car, where the car is electrically propelled, this source of power being indicated at 66. Included in the circuit is a limit switch 67, of a conventional type. Limit switches have acquired a distinct status in the art, and it is believed that it is unnecessary to illustrate the specific construction of this well known switch. The function of this switch is to permit the cranks 43 to make a single revolution only, at each closing of the circuit. The circuit comprises conductors 68 and 69, which terminate in contact pieces 70—71, in a shoe 72, of insulating material, said shoe being mounted upon the top of the car, in position to engage a metallic contact shoe 73, which may be supported from a trolley pole, or like support 74, when, in the travel of the car, it approaches a cross street, and shoe 72 rides over shoe 73, said metallic shoe 73 will bridge the contact strips 70—71, and complete the circuit. The momentary closing of the circuit, at the shoe 72, may operate a relay 75, the magnet of which is in series with conductor 68, to hold the circuit closed for a predetermined length of time, or until the limit switch 67 acts to break it.

The spools are provided with friction brakes consisting of spring arms 76, which bear upon toothed members or gears 77, of the spools.

In Figs. 10 to 13 we have illustrated means for actuating cables corresponding to the cables 45—46 mechanically instead of electrically. In this case, a framework 78 is mounted upon the roof of the car. Transversely extending arms 79 are adapted to engage with suitable stops or projections carried by the trolley poles, or other supports, disposed along the car line. These stops are not shown, since the use of stops of this nature, to actuate street indicating devices, is quite common in the art.

The arms 79 are adapted to actuate their respective mechanisms, when moving in either direction. That is to say, the car may be moving in either direction when the arm is engaged, and yet the mechanism will operate perfectly. These arms are carried by vertical rock shafts 81, which are journaled in suitable bearings 78$^a$. Each of these rock shafts carries a transversely extending bar 82, in the outer ends of which vertical rods 83 are mounted. Links 84 are pivotally connected to and extend between the upper and lower ends of these shafts. Additional centrally disposed rods 85 are carried by the links at a substantially central point in their length, and these last named rods 85 traverse a horizontal bar 86, which is carried by a centrally disposed vertical rock shaft 87. Consequently, it will be seen that swinging movement in a horizontal plane of either of the arms 79 will result in imparting partial rotation to the rock shaft 87, through the connections described. Springs 88 and yokes 89 return the arms 79 to their intermediate position, or the position where they project at right angles to the frame, after said arms have passed the stops of the trolley pole. The springs 88 are connected to the frame 78, and to the yokes, aforesaid, and the yokes are adapted to be engaged by arms 90 of the rock shafts 81. That is to say, if the movement of this rock shaft is in one direction, one of said arms will engage one of the yokes, and pull it out against the tension of the spring, while if the movement of the rock shaft is in the other direction, the other yoke will be engaged by the corresponding arm 90, and be pulled out against the tension of its spring.

During the time that one yoke is being pulled outwardly, the other yoke stands still, being drawn by its spring against a stop bracket 91, to which end the said yokes are provided with ears 92, adapted to engage with said brackets. The lower end of the rock shaft 87 is mounted to turn in a cross head 93, said cross head consisting of plates that are guided upon vertical rods 94.

The cross head structure comprises a combined rack bar 95 and a ratchet bar 96. A gear wheel 97, on a shaft 98 meshes with the rack bar, while a pawl 99 engages with the ratchet bar. A second gear wheel 100 meshes with the gear wheel 97, and the shaft of this second gear wheel carries a ratchet wheel 101. The pawl 99 is spring actuated toward the ratchet bar by a spring 102. The rear end of the pawl is shaped, as indicated at 103, to engage the ratchet wheel. A spring 104 extends between the top of the pawl and a fixed member 105 of the frame. A lever 106 is pivoted at 107, and its free end is drawn downwardly by spring 108, said lever being drawn by said spring into engagement with the tail of the pawl, holding the portion 103 of said pawl into proper relation with the ratchet wheel. The shaft of the gear wheel 97, carries a sprocket wheel 109, and by suitable connections to said sprocket wheel, the motorman may, through connections 109ª at the end of the travel of the car in one direction, turn said sprocket wheel, to cause the gear 97 to raise or lower the rack bar and, consequently, to raise or lower the oscillatory shaft 87. The pawl, and associated parts, hold the rack bar, and consequently, the whole cross head structure, in the vertical position to which it may be adjusted, the ratchet wheel 101 imparting a step-by-step withdrawal to the pawl when the adjusting movement of the cross head is to be a downward one.

This bodily vertical adjustment of the rock shaft moves the bar 86 either upwardly or downwardly, as the case may be, so that pins 110—111, projecting upwardly and downwardly therefrom, at the opposite ends thereof, may engage in eyes 112—113, of the cables 45ª—46ª, 45ᵇ—45ᵇ. These cables pass over guide pulleys 114—115, and between pairs of idler rolls 116—117. The idler rolls are grooved and the eyes of the cables are shaped to fit into said grooves, so that when the cables are not being drawn upon by the mechanism, the shanks of the eyes will lie snugly between the rolls and the eyes proper will be held in a horizontal position, and in position to be engaged by the pins 110 or 111, as the case may be.

With the pins engaged with the eyes, a swinging movement of bar 86 in either direction will result in drawing upon the cable with which the pin is engaged. That is to say, if the swinging movement is in one direction, the cable will be drawn around the idler roll 116, while if the movement of the bar is in the opposite direction, the cable will be drawn around roll 117. The purpose of duplicating the pins at the opposite ends of the bar 86 is to render it possible to manipulate four cables with the same mechanism. By virtue of this arrangement we are able to make this single mechanism serve as the manipulating means for two street indicating devices, one at each end of a car, it being understood that each device requires two cables, as previously described; a pull upon one of which actuates the web in one direction, and a pull upon the other of which actuates the web in the opposite direction.

The sprocket wheel 109 and connections 109ª may be duplicated to permit the setting of the mechanism from either end of the car. We contemplate using a bell 115, which operates in the manner described in respect to bell 28, but is in conjunction with web 7, this being to attract attention to the device at each street stop, if desired.

It is to be understood that the invention is not limited to the precise construction set forth, but that it includes within its purview whatever changes fairly come within either the terms or the spirit of the appended claims.

Having described our invention, what we claim is:

1. A device of the character described, comprising in combination a web adapted to be fed past a sight opening and containing the names of streets, a feed mechanism for said web comprising a roll over which said web passes, and an actuating disc for said roll, a flexible element and a mechanism mounted for bodily sliding movement to which said element is connected, said mechanism comprising a part, which, when the cable is initially drawn upon, is swung into position to engage said disc, additional pull upon the cable bodily moving said mechanism apart to impart movement to said disc and through the disc to the feed mechanism.

2. A structure as recited in claim 1, in combination with a movable web carrying advertising matter adapted to be fed past a sight opening, a feed roll for the last named web, and a driving connection between the first named feed roll and the last named feed roll.

3. A device of the character described, comprising a web adapted to be fed past a sight opening and bearing the names of streets, a feed roll for said web, a disc carrying laterally projecting elements, gearing between said disc and the feed roll, and a mechanism for actuating said disc comprising a slidable cross head, a swinging lever on said cross head, a flexible cable attached to said swinging lever, a gear having a projecting finger, teeth upon the swinging lever engaging said gear, a detent for resisting bodily movement of the cross head, and means movable under the action of the swinging lever for releasing said detent, an initial pull upon the cable acting to swing the projecting finger into position to engage the laterally projecting elements of the disc and the continued pull upon the cable releasing the detent and permitting the bodily travel of the cross head to cause said projecting finger to shift the disc one step, and correspondingly move the feed roll and web.

4. A structure as recited in claim 3, in combination with a pair of spools upon which the opposite ends of the web are wound, spring actuating means for imparting a take-up movement to the spools, and elements carried by the cross head for placing said springs under tension.

5. A device of the character described, comprising a supporting frame, a pair of spools therein, a web the opposite ends of which are engaged with said spools, a feed roll intermediate the spools, a disc geared to the feed rolls having laterally projecting members extending beyond its opposite sides, and a pair of feed mechanisms for acting upon said disc, one of which feeds the web in one direction, the other of which feeds the web in the other direction, each of said mechanisms comprising a slidably mounted cross head upon which there is mounted a swinging lever, a cable attached to each of said swinging levers, a spring extending between the swinging lever and the frame, a gear to which the swinging lever is attached, a second gear meshing therewith, carrying a projecting finger, a detent pivoted upon the cross head and adapted to engage a member of the frame, spring means extending between the cross head and the frame, and resisting movement of the cross head, and a trip for the detent engaged with the teeth of the gear of a swinging lever, initial movement of the swinging lever, under the pull of its cable, swinging the projecting finger downwardly in position to engage the corresponding projecting elements of the disc, a continued movement of the swinging lever under the pull of its cable, moving the trip to release the detent, whereupon continued movement of the cable moves the cross head, an associated mechanism, bodily to cause the projecting finger to shift the disc and impart movement of the feed roll.

6. A structure as recited in claim 5, in combination with a pair of spring actuated ratchet bars mounted for slidable movement, ratchet wheels upon the spools engaged with said ratchet bars, springs tending to move the ratchet bars in such direction as to cause a take-up action of the spools, and means upon the cross heads for moving the ratchet bars in such direction as to place their respective springs under tension.

7. A structure as recited in claim 5, in combination with an advertising web and a sight opening over which it passes in its travel, a gearing between the feed roll and said web to impart a step-by-step movement to the latter from said feed roll.

8. A structure as recited in claim 5, in combination with a pair of cranks, and means for imparting a single revolution to said cranks, said cables being attached to said cranks.

9. A structure as recited in claim 5, in combination with a pair of electric motors, a pair of cranks to which the ends of the cables are attached, reducing gearing between the motors and the cranks, said motors imparting a single revolution to the cranks when they are energized.

10. A structure as recited in claim 5, in combination with an advertising web, and means for moving said web from the first named feed roll and an audible signal arranged to be sounded each time the advertising web is moved.

11. A structure as recited in claim 5, in combination with an advertising web, and means for moving said web from the first named feed roll and a bell arranged to be sounded each time the advertising web is moved.

12. A structure as recited in claim 5, in combination with a bell, and means for sounding the same when the web completes its travel in one direction.

13. A structure as recited in claim 5, in combination with pneumatic cushioning means resisting the return movement of the cross heads.

14. A structure as recited in claim 5, in combination with friction brakes for preventing overthrow of the spools.

In testimony whereof we affix our signatures.

THEMISTOCLES THEOHARIS.
JOHN FOTAKIS.